April 14, 1953
C. H. SMITH ET AL
2,634,927
APPARATUS FOR TRANSFERRING FUEL AND OTHER LIQUIDS
FROM ONE AIRCRAFT TO ANOTHER IN FLIGHT
Filed Jan. 17, 1950
14 Sheets-Sheet 2

Inventor
C. H. Smith + P.S. Macgregor
By Watson, Cole, Grindle & Watson
Attorney April 14, 1953 C. H. SMITH ET AL 2,634,927
APPARATUS FOR TRANSFERRING FUEL AND OTHER LIQUIDS
FROM ONE AIRCRAFT TO ANOTHER IN FLIGHT
Filed Jan. 17, 1950 14 Sheets-Sheet 4

Inventor
C. H. Smith + P. S. Macgregor
By
Watson, Cole, Grindle + Watson
Attorney

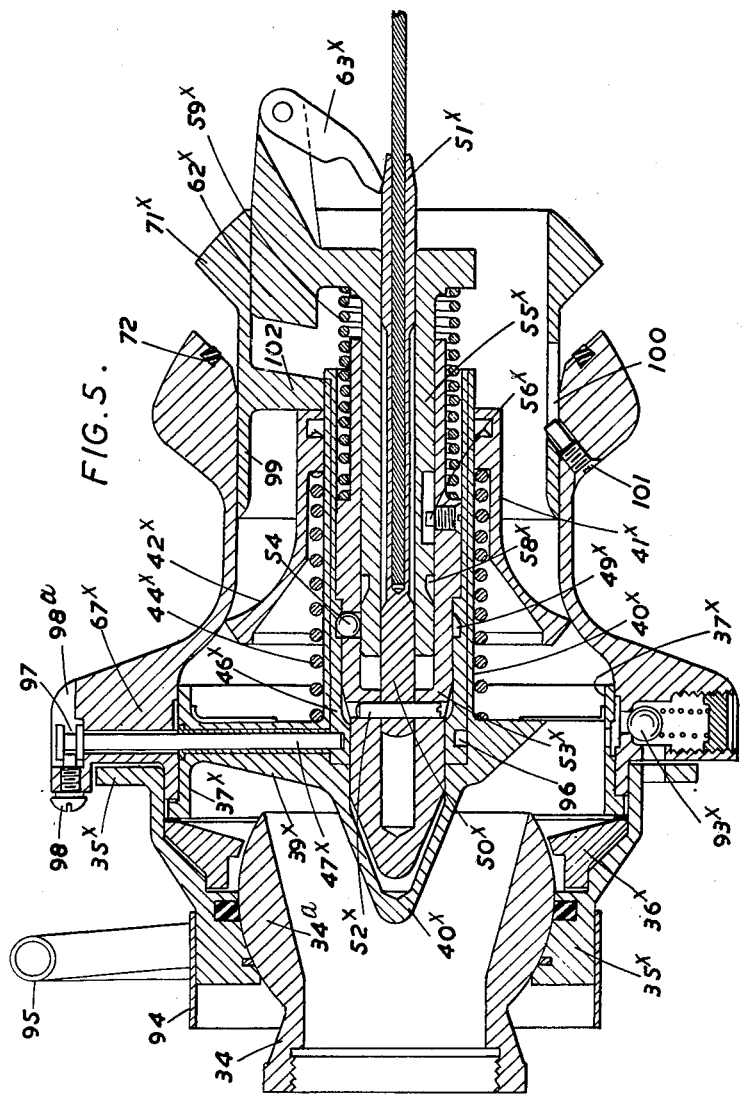

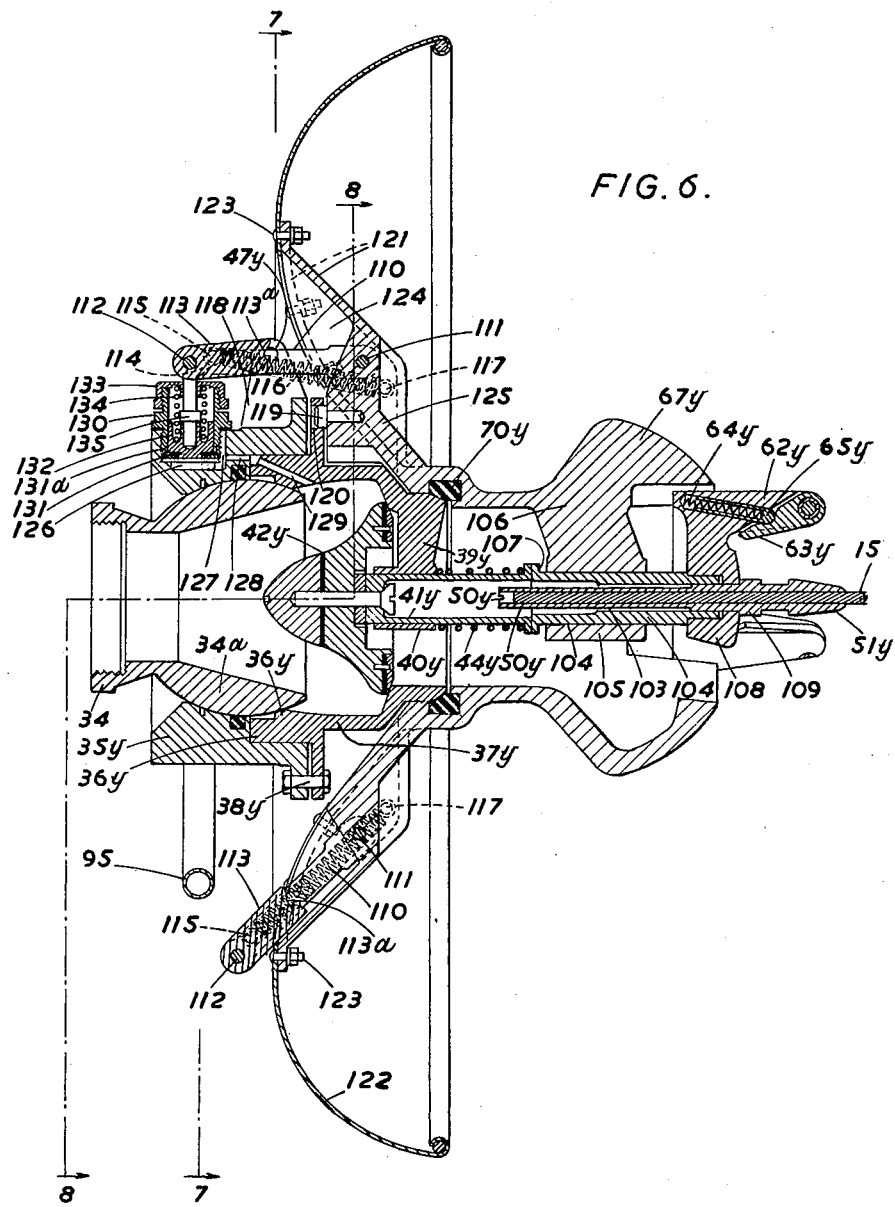

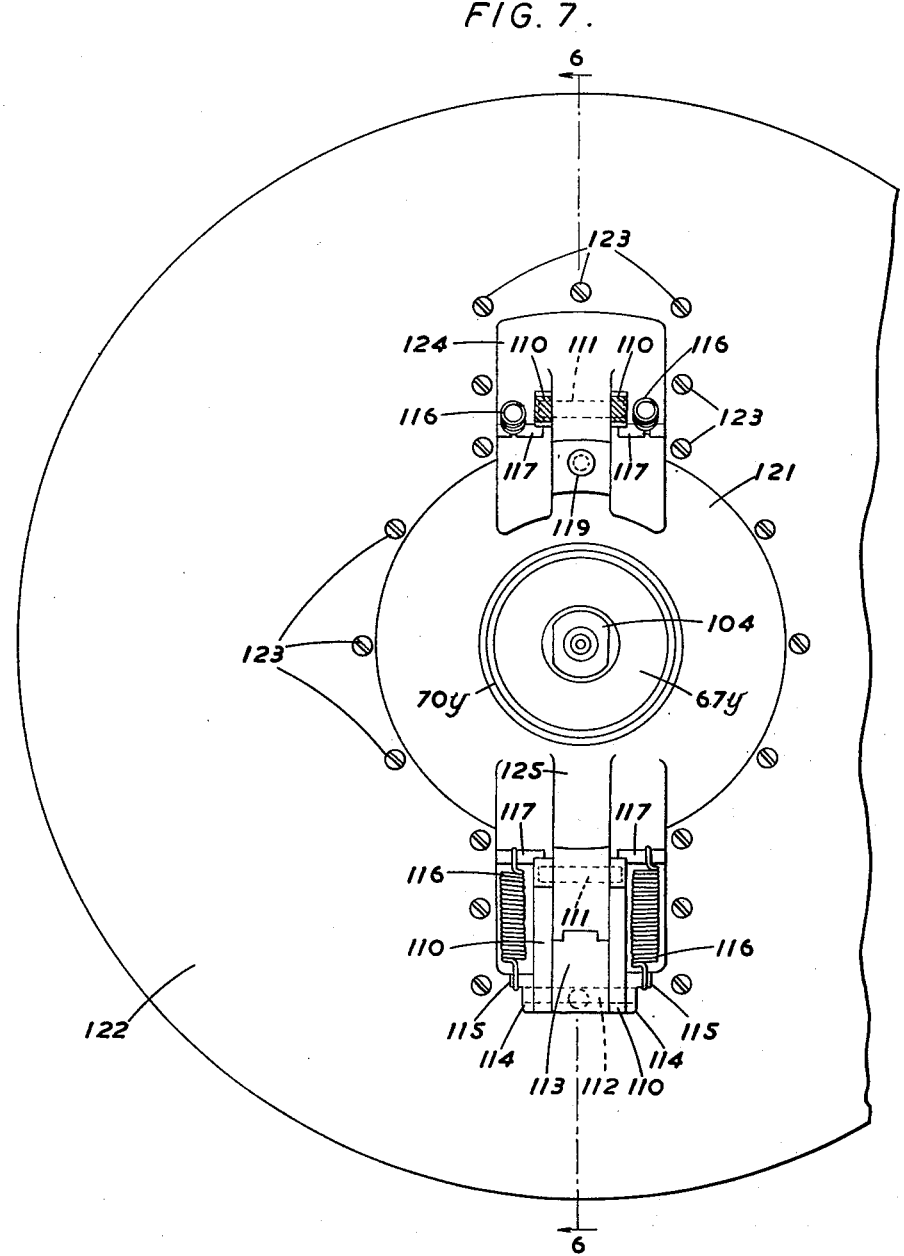

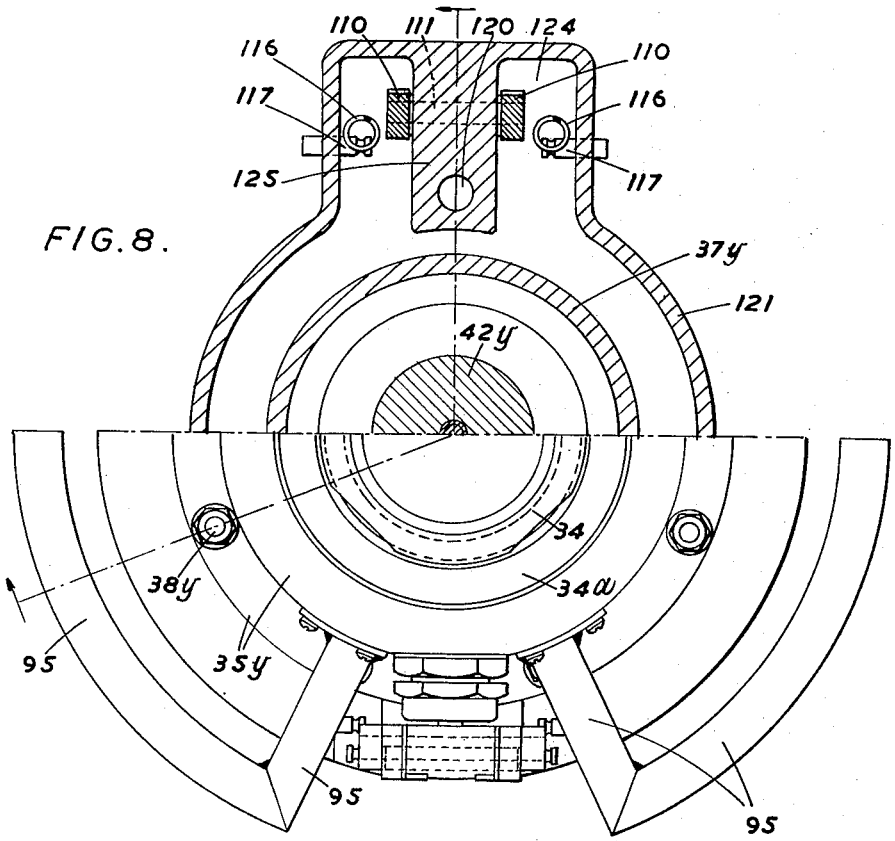

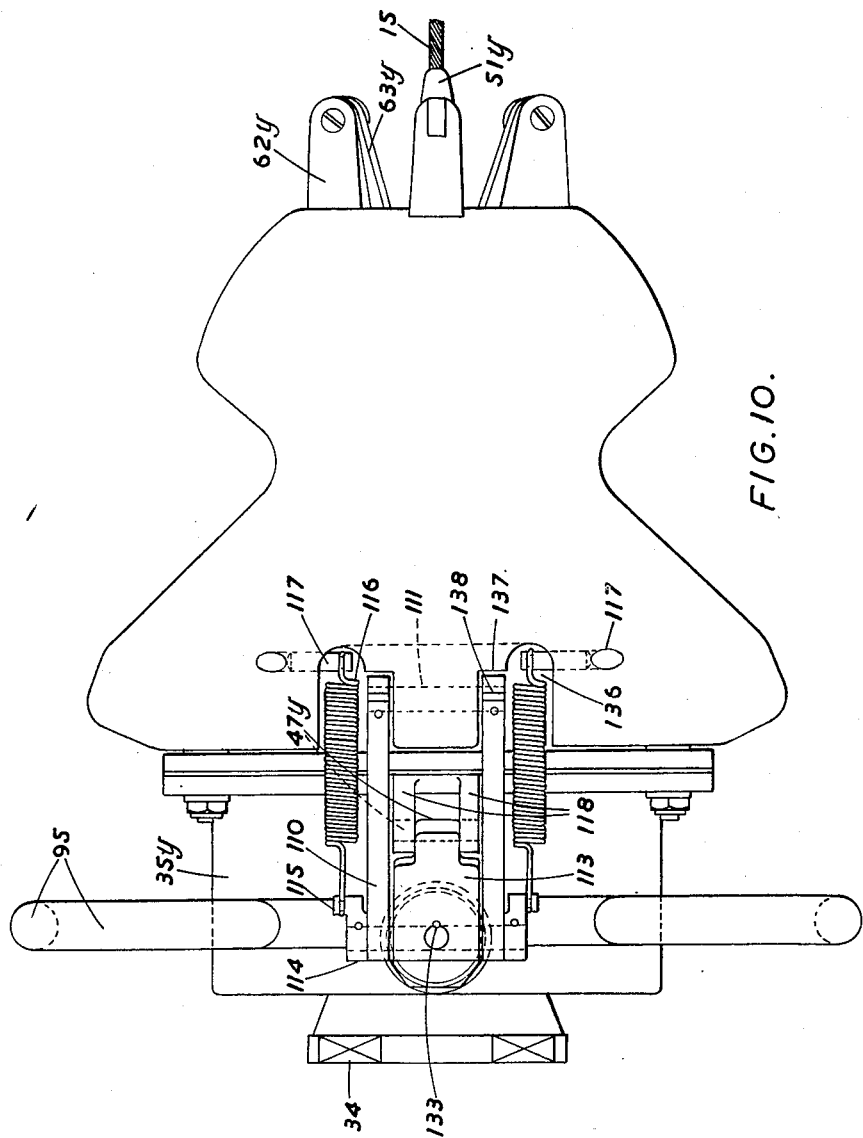

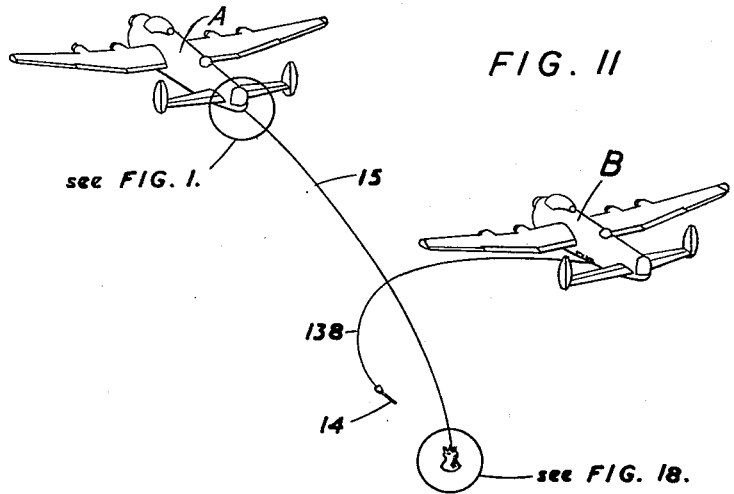
FIG. 11
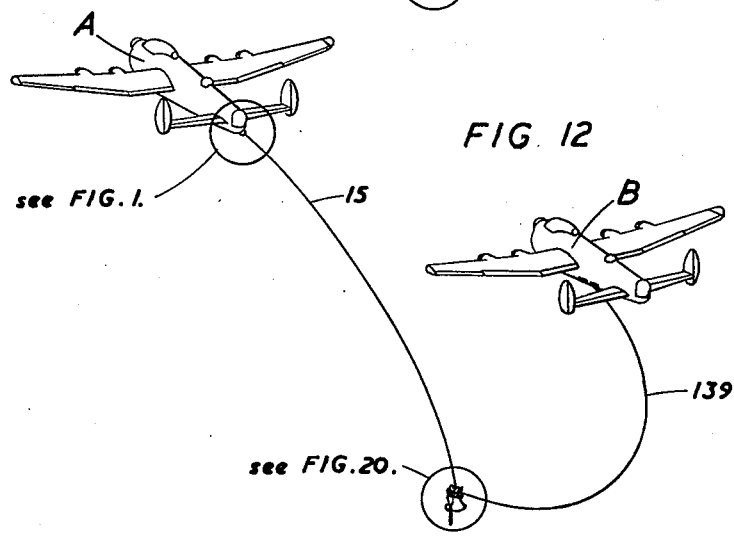
FIG. 12
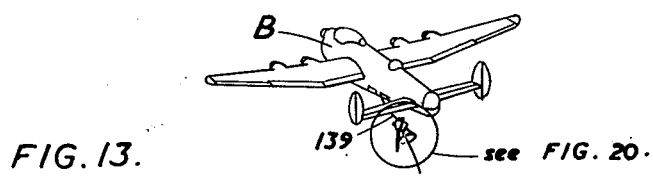
FIG. 13.
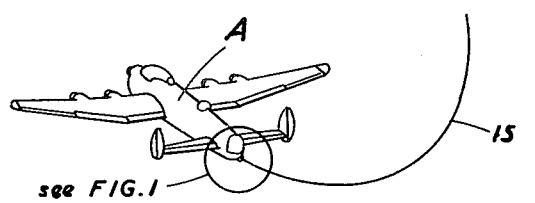

Patented Apr. 14, 1953

2,634,927

UNITED STATES PATENT OFFICE 2,634,927

APPARATUS FOR TRANSFERRING FUEL AND OTHER LIQUIDS FROM ONE AIRCRAFT TO ANOTHER IN FLIGHT

Charles Harry Smith, Bognor Regis, and Peter Stevens Macgregor, Littlehampton, England, assignors to Flight Refueling Limited, London, England, a British company Application January 17, 1950, Serial No. 138,958
In Great Britain January 18, 1949

20 Claims. (Cl. 244—135)

This invention relates to apparatus for transferring liquid in bulk from one aircraft to another in flight, more especially for refuelling, and comprises certain novel combinations of components carried by the aircraft receiving the liquid (referred to as the "receiver") and by the aircraft supplying the liquid (referred to as the "tanker") respectively.

The invention relates more particularly to a system in which the tanker carries a hose that can be unreeled and trailed and a "contact line" that can be ejected or trailed, and the receiver has a coupling element having a fuel transmitting passage and adapted to be coupled to the tanker's hose, and a hauling line that can be unreeled and is provided with means whereby it can be picked-up and grappled to the contact line of the tanker and other means whereby it can be connected to the hose on being hauled aboard the tanker by the contact line, to enable the end of the hose to be brought up to the coupling element and engaged therewith on reeling in the hauling line.

Hitherto it has been the practice to mount a combined sinker and grapnel detachably on the hauling line and for this item to be detached by the tanker's crew and retained in the tanker on bringing the end of the hauling line aboard for attachment to the hose, and, on completion of a refuelling operation, or in the event of an "emergency break-away" while refuelling is in progress, for the hauling line to be jettisoned by the receiver, and salvaged by the tanker, the hauling line remaining attached to the hose and being provided with a "Weak-link" which becomes exposed and parts when the hauling line is fully paid out.

To enable refuelling to be resumed after an emergency break-away or a second refuelling operation to be performed without landing, the receiver must carry a spare hauling line, and combined grapnel and sinker, and the spare hauling line must be connected to the winding gear, reeled and rove through its guides after clearing away the severed inboard end of the old hauling line and before attaching the grapnel and sinker.

It is an object of the invention to eliminate this cumbrous procedure and the weight penalty of the spare parts.

A further object is to eliminate man-handling of the receiver's equipment, all necessary manual operations being performed aboard the tanker.

In pursuance of these objects the invention provides for elimination of the detachable sinker-grapnel, by making the grapnel a permanent fixture on the hauling line and by either eliminating the sinker altogether or combining it with a nozzle element permanently secured to the hauling line and connectible to the end of the hose, the invention further providing for detachment of the hauling line from the hose by remote control from one of the two aircraft.

Another object of the invention is to provide for the retention on the end of the hauling line of the grapnel, hose-connecting means and nozzle element (when the latter is separate from the hose) in the event of an emergency breakaway, by including in the hose-mounted part of the means connecting the hose to the hauling line an easily shearable pin which parts when the hauling line is overloaded and can be quickly replaced by a spare on bringing the hose end aboard the tanker.

Yet another object of the invention is to facilitate an alternative technique for making contact between the contact line and the hauling line involving trailing the contact line across the hauling line instead of ejecting the contact line in the path of the hauling line, by replacing the sinker element by a drogue which causes the hauling line to stream nearly horizontally with little droop.

How the foregoing objects and others as may hereinafter appear are achieved will be more readily seen from the following description having reference to the accompanying drawings which illustrate by way of example three preferred embodiments of the invention and a modification, without limitation of the scope of the invention as defined in the appended claims.

In the drawings,

Figure 5 is a view similar to Figure 2 of a second form of construction;

Figure 6 is a view similar to Figure 2 of a third form of construction, the section being taken on lines 6—6 of Figure 7 and 6ª—6ª of Figure 8;

Figure 7 is a part-sectional elevation taken on the line 7—7 of Figure 6 with the spider member and hose-connection removed;

Figure 8 is a view partly in elevation and partly in section, on the line 8—8 of Figure 6;

Figure 9 is a view similar to Figure 6, omitting the spider member and hose-connection and illustrating a modified nozzle.

Figure 10 is a view in the direction of the arrow 10 of Figure 9 with the spider member and hose-connection attached.

Figure 18:
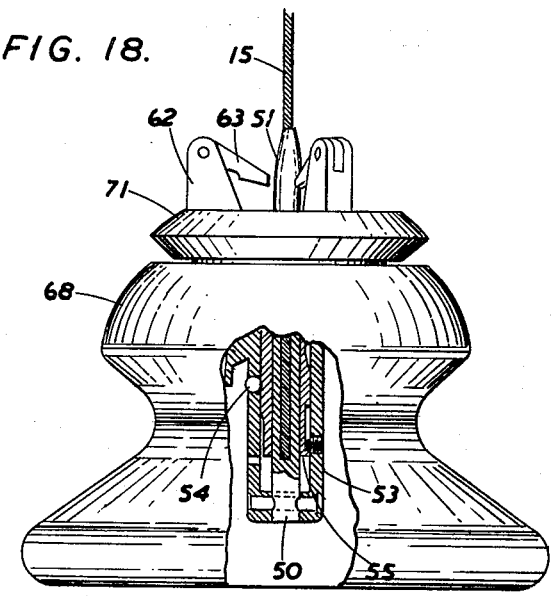
Figure 19:
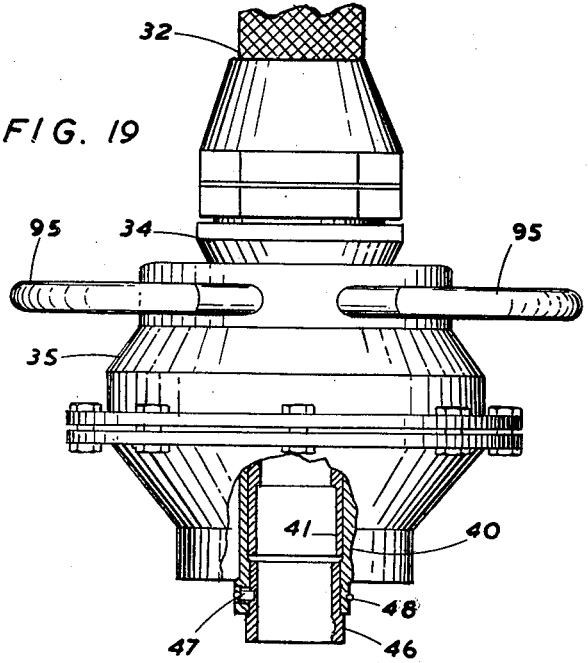
Figure 20:
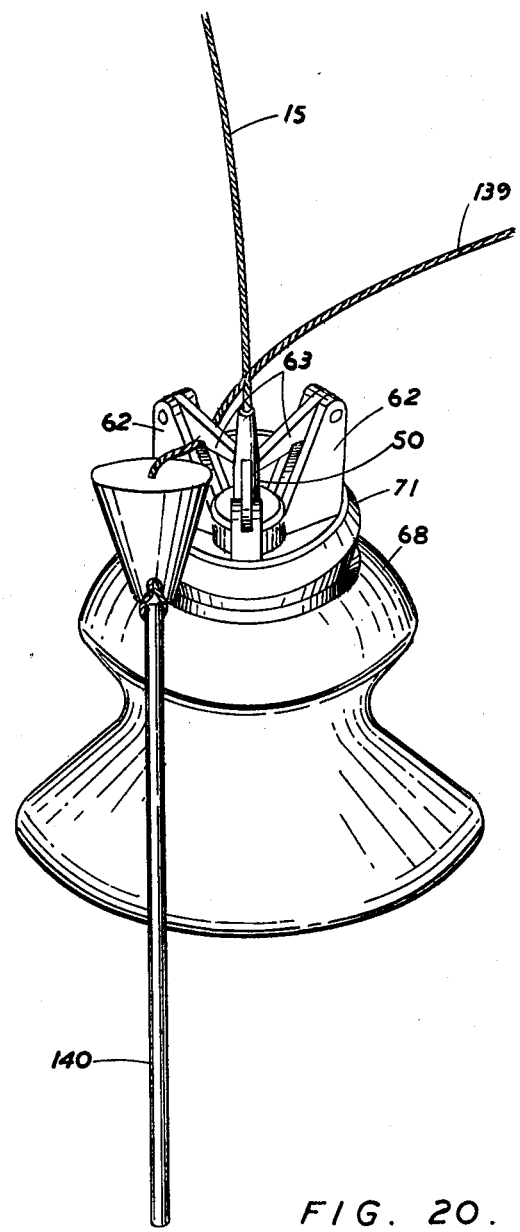

Figures 11 to 17 illustrate diagrammatically, successive stages in the operation of flight refuelling, using apparatus as illustrated in Figures 1 to 4; and Figures 18, 19 and 20 are enlargements of parts of Figures 11 and 17, Figure 17 and Figures 12 and 13 respectively.

Figure 1:
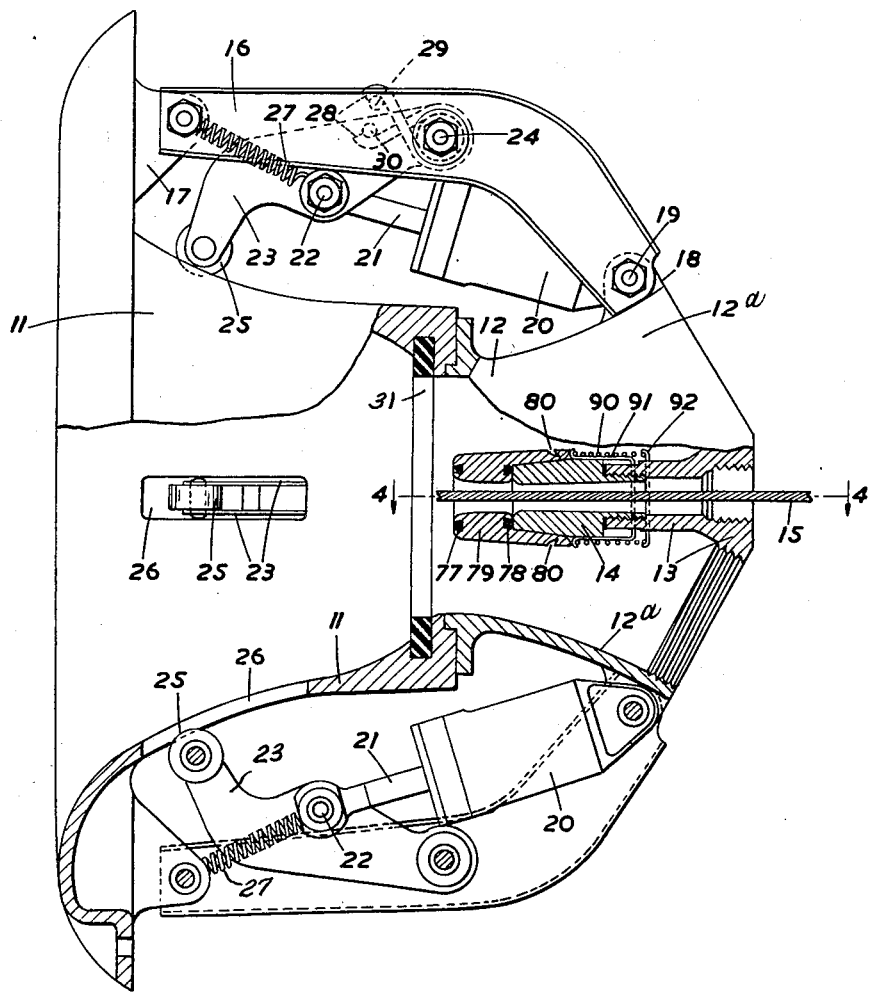
Figure 1 is an axial section, partly in plan (or elevation depending on the attitude in which the component is mounted in the aircraft) of the nozzle-receiving coupling element, or "nozzle-coupling" of the receiver aircraft.

The nozzle-coupling shown in Figure 1 is common to all three forms of construction and comprises a trumpet-mouthed bell 11, the inner end if which is continued by a branched conduit 12, whose two outlets 12ª are screw-threaded internally for connection to pipes leading to the fuel tanks of the aircraft. The nozzle-coupling is mounted in the aircraft with its mouth exposed and facing aft. In the centre of the member 11 is an integral boss 13 axially bored and screw-threaded to receive a rearwardly projecting fair-lead 14 through which is rove a hauling line 15.

Brackets 16, bolted to lugs 17 on the bell 11 and lugs 18 on the conduit 12, are arranged in pairs and between the two brackets of each pair is a hydraulic jack 20 pivoted on the bolt 19 securing the brackets to lug 18. The ram 21 of each jack 20 is pivotally connected by a bolt 22 to a lever or "toggle" 23 which is pivotally supported on the brackets 16 by a bolt 24 and carries a roller 25 at its extremity, the bell 11 being slotted at 26 to accommodate the toggles. Tension springs 27 connect each bolt 22 to lug 17 and a coil spring 28 engages pins 29, 30 respectively secured to bracket 16 and toggle 23. When the jack 20 is not energised both springs 27, 28 tend to withdraw the toggle 23 from the interior of bell 11 into the position shown in Figure 1.

The bell 11 is circumferentially grooved internally to receive a sealing ring 31 of neoprene or the like soft, resilient, petrol-resisting material.

Figure 2:
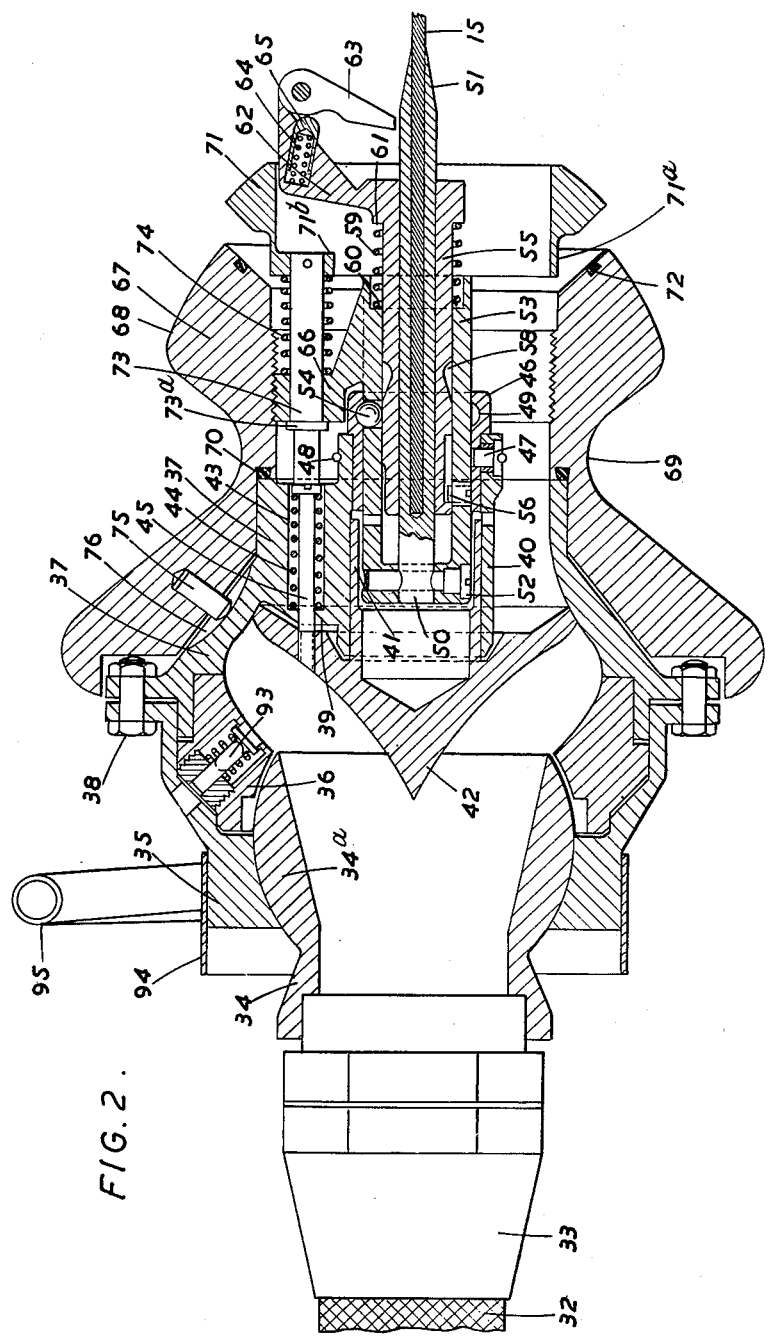
Figure 2 is an axial section in the line 2—2 of Figure 3 of a first form of construction of hose-coupling member or "spider member" and its connection to the hose, connected to the hauling line by means of a latching member carrying a grapnel and sinker-nozzle element, or "nozzle"

Figures 2, 3, 18 and 19 illustrate the means by which the outboard end of the hauling line 15 is connected to the hose trailed by the tanker aircraft. Referring first to Figures 2 and 18, the end of the hose 32 is secured to an adaptor 33, which screws into the internally threaded end of a hollow joint member 34 having a male spherical portion 34ª, enclosed in a female spherical seating formed on a flanged joint ring 35 and a packing ring 36 trapped between the flanged joint ring 35 and a spider member 37 which is secured by bolts 38 to the flanged joint ring 35.

The spider member has three inwardly extending, integral radial webs 39 supporting an integral, axially bored central boss 40, in which slides the tubular stem 41 of a poppet valve member 42. In each web 39 a longitudinal recess 43 houses a compression spring 44 trapped between the bottom of the recess and the head of a stud 45, which is slidable in an opening in the web at the bottom of the recess and is screwed into the valve member 42. The latter is thus loaded by the springs 45 to seat on the inner face of the outer wall of the spider member 37 as shown in Figure 2.

In the outer end of the boss 40 an open-ended socket 46 is inserted and secured by pins 47 whose shear strength is such that they constitute the weakest element in the structure transmitting tensile load from the hose to the hauling line. The pins 47 are easily extractable for replacement being retained by a circlip 48. In the socket 46 is an internal circumferential groove 49, the purpose of which is explained below.

Referring now to Figures 2 and 19, on the end of the hauling line 15 is swaged a steel rod 50, the inner end of which is tapered at 51 to form a cone, the outer end being secured by means of a stud 52 to a blind-ended sleeve 53 which fits slidably in the socket 46 and has openings each housing a ball 54, of which one is shown, the ball diameter being greater than the wall-thickness of the sleeve 53. The balls are prevented from escaping outwards by a constriction of the ball-housing openings at the outer end and from escaping inwards by a hollow plunger 55, which fits slidably in the sleeve 53 and has a circumferential ball-receiving groove 58. A grub-screw 56 screwed into sleeve 53 enters a slot 57 of limited length in the plunger 55 and thus limits the movement of the plunger relatively to the sleeve. A compression spring 59 trapped between the base of a recess 60 in the end of the sleeve 53 and a shoulder 61 on the plunger 55 urges the latter, relatively to the sleeve 53, into the position shown in Figure 2, in which the plunger causes the balls 54 to stand proud of the sleeve 53. In this position they can engage the groove 49 of the socket 46, thus locking these two parts together, as shown in Figure 2. When the plunger 55 is moved to the left in Figure 2 against the effort of spring 59 to bring the groove 58 into register with the ball-housing openings of sleeve 53, the balls 54 can recede into the groove 58 until they no longer stand proud of sleeve 53, thus allowing the latter to be withdrawn from or reinserted in the socket 46. The sleeve 53, balls 54 and plunger 55 thus constitute a latching device detachably connectible to the socket 46, which constitutes a latch-engaging member.

The plunger 55 has three integral brackets 62 (one only being shown in Figure 2) on which are pivoted grapnel arms 63 urged by compression springs 64 into the position shown in Figure 2 in which the extremities of the grapnel arms meet the conical end 51 of rod 50, each spring 64 being trapped between a thimble 65 which bears upon the grapnel arm 63 and the base of a recess in the arm 62, in which recess the thimble slides. When a "contact line" having a hooked or enlarged extremity is ejected or trailed by the tanker aircraft and meets any one of the grapnel arms, as hereinafter described and illustrated in Figures 11, 12, 13 and 20, the latter is pressed inwards against the effort of spring 64 allowing the contact line to pass, thereafter returning to the position illustrated to trap the contact line, the entry of which into the grapnel is facilitated by the cone 51 formed on the end of the rod 50. The sleeve 53 has three integral arms 66 (of which one only is shown) forming a spider on which is fixed a nozzle 67 which has a portion 68 shaped to fit the interior of the bell 11 shown in Figure 1 and a neck 69 engageable by the toggles 23, 25 (see Figure 1). The part of the element 67 appearing to the left in Figure 2 is counterbored to fit slidably on the end of the spider member 37 and has an annular recess in which is mounted a sealing ring 70 of neoprene or the like material which engages the outer face of the spider member to seal the joint between it and the nozzle when the sleeve 53 is latched to the socket 46, as shown in Figure 2. The extremity of the nozzle 67 is completed by a separate nozzle tip 71 having a tubular skirt 71a which is axially slidable in the mouth of the nozzle 67, the joint between the nozzle 67 and nozzle tip 71 being sealed by a neoprene or like sealing ring 72 located in an annular recess of the nozzle 67 (see Figure 4). The skirt 71a has integrally formed lugs 71b to which are secured push rods 73 which slide longitudinally in openings formed in the spider arms 66 between which and the lugs 71b are trapped compression springs 74 which urge the nozzle tip 71 away from the nozzle 67 into the position shown in Figure 2, the extension of the nozzle tip being limited by the engagement of collars 73a formed on the push rods 73 with the spider arms 66. When the sleeve 53 is latched to the socket 46, thus bringing the nozzle 67 into sealed relationship with the spider member 37, the extremities of the push rods 73 enter the recesses 43 of the spider member 37 to engage the heads of the studs 45 secured to the valve member 42. To ensure alignment of the push rods 73 with the recesses 43 when inserting the sleeve 53 into the socket 46 the nozzle 67 is provided with inwardly projecting pins 75 which enter shallow slots 76 formed in the outer face of the spider member 37. In effecting the connection of the parts the spider member 37 must be rotated relatively to the nozzle 67 until the pins 75 register with the slots 76.

The inner female spherical packing ring 36 is provided with a spring-loaded relief valve 93 exhausting to atmosphere through an opening in the outer female spherical joint ring 35 for relieving excessive internal pressure in the hose due to surging of the fuel; and attached to the joint ring 35 is a sleeve 94 carrying handling loops 95 of tubular construction similar to those better illustrated in Figures 6 to 8, to facilitate handling of the heavy hose-end in the tanker aircraft when connecting it to the hauling line by means of the latching device 53, 54, 55 and socket 46.

Figure 14:
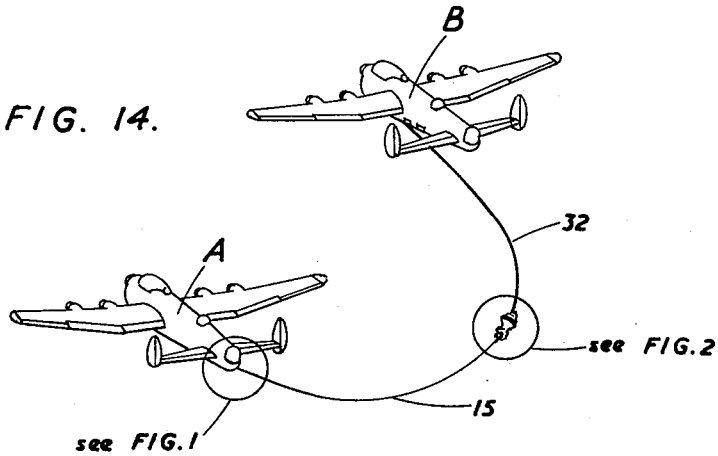

Figure 2 shows the position of the parts after connection of the hauling line 15 to the hose 32 by latching the sleeve 53 to the socket 46, thus bringing the nozzle 67 onto the spider member 37 and sealing the joint between them (see also Figure 14). In this position the nozzle tip 71 is extended by the springs 74 and the valve 42 is held on its seating by the springs 44. When the hauling line is wound in (see Figure 15), the nozzle 67 enters the nozzle-coupling shown in Figure 1 and the nozzle tip 71 meets the sealing ring 31. On energising the hydraulic jacks 20, the toggles 23 are pulled inwards to engage the neck 69 of the nozzle 67 and draw the nozzle into the nozzle-coupling; the nozzle-tip 71 is thus pressed into the nozzle 67, compressing springs 74; and the push rods 73 press the studs 45 inwards compressing the springs 44 and raising the valve member 42 off its seating.

Figure 4:
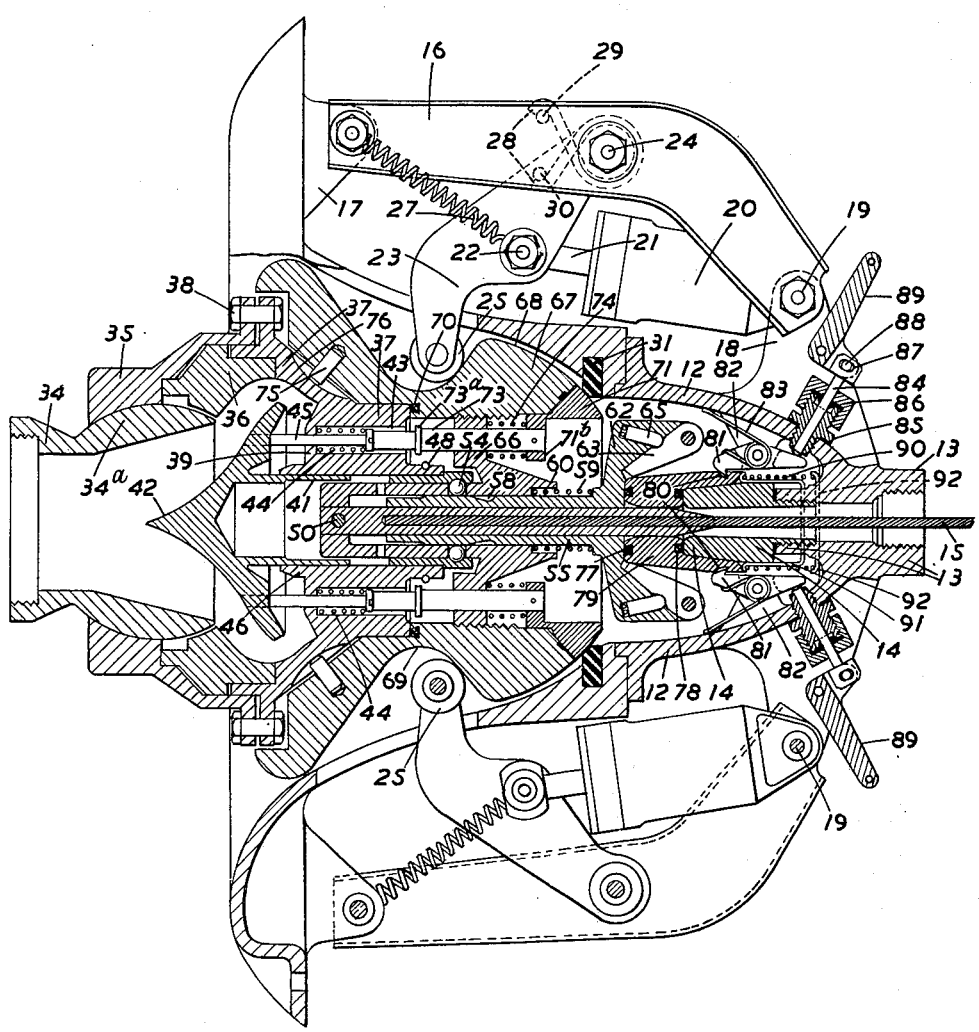
Figure 4 is an axial section of the parts illustrated in Figures 1 and 2 with the nozzle secured in the nozzle-coupling, the section of the nozzle-coupling being taken in a plane perpendicular to that of Figure 1.
Figure 15:
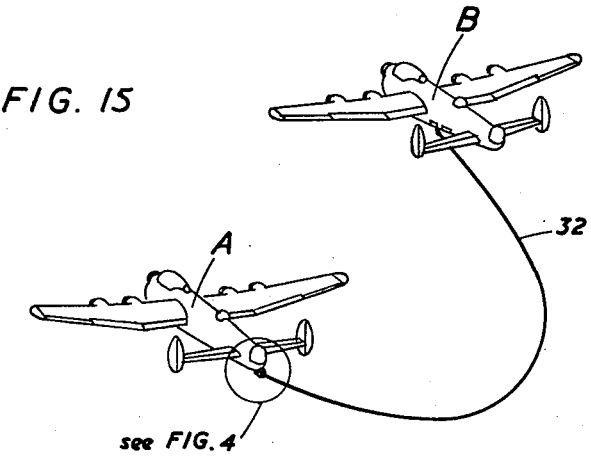
Figure 16:
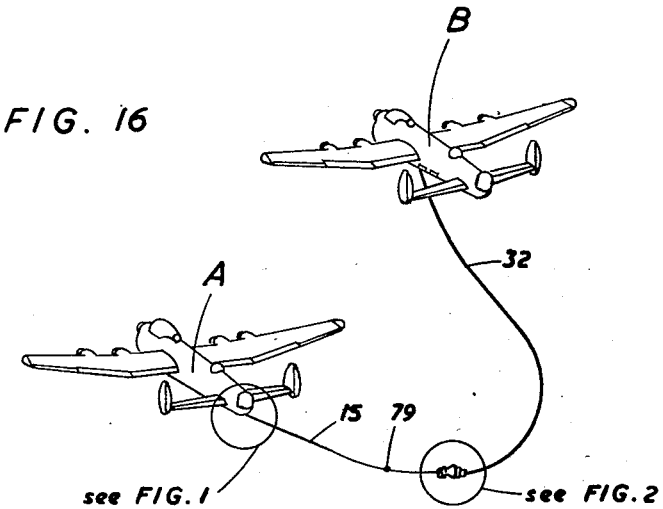
Figure 17:
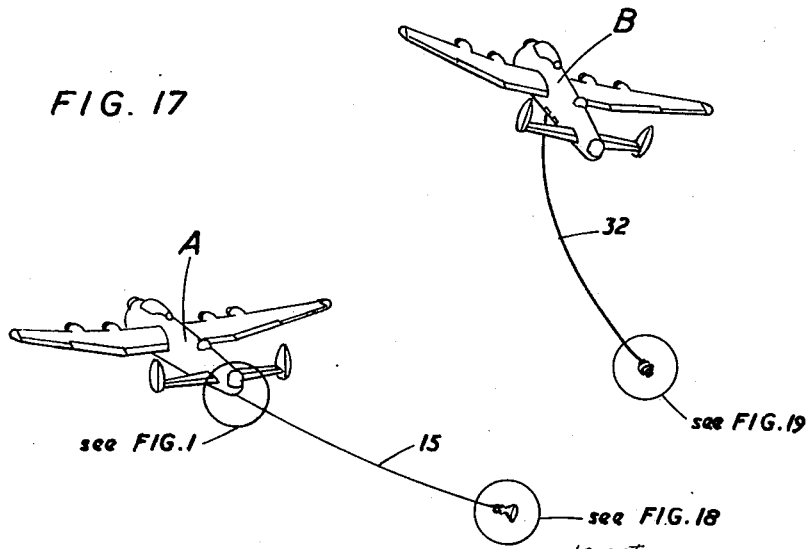

Figure 4 shows the position of all parts when the nozzle is secured in the nozzle-coupling of the receiver aircraft (see also Figure 15). Fuel can now pass from the tanker aircraft through the hose 32, spider member 37, nozzle 67 and nozzle-tip 71 into the branched outlets 12a of the conduit 12, the joint between the nozzle-assembly 67, 71 and the nozzle-coupling being sealed by engagement of the nozzle-tip 71 with the sealing ring 31. Escape of fuel into the fairlead 14 is prevented by engagement of the opposing faces of plunger 55 and fairlead 14 with sealing rings 77, 78 located in annular recesses of a part 79, further referred to below, which is interposed between the fairlead and the plunger.

The part 79 is a small loose annular weight slidable on the hauling line 15 and formed with a skirt that fits on the nose of the fairlead 14. In the skirt of the weight 79 is an undercut annular groove 80 engageable by catches 81 pivotally mounted on inwardly projecting lugs 82 integral with the branched conduit 12, the catches 81 being urged to engage the notches 80 by hairpin springs 83. The tail of each catch is engageable by a pin 84 slidable in a gland comprising a bushing 85 screwed into the wall of conduit 12 and a cap 86 screwed onto the bushing. The head of pin 84 has a slot 87 engaged by a pin 88 mounted on one arm of a bell crank lever 89 which is pivoted on the lug 18. The other arm of the bell crank 89 is connected to any suitable control mechanism, not illustrated. Slidable on the fairlead 14 is a flanged sleeve 91 on which is mounted a compression spring 90 which is thus trapped between the end of the skirt of the weight 79 and an abutment plate 92 mounted on the boss 13 of the conduit 12. Normally, the weight 79 is retained on the fairlead 14 by the catches 81 which are held in engagement with the groove 80 by their springs 83. When the bell cranks 89 are rocked in the direction of the arrows shown in Figure 4, the pins 84 are driven inwards to rock the catches 81 against the efforts of their springs 83 to release the weight 79 which is thereupon ejected to slide down the hauling line by the spring 90. This operation is performed after the hauling line, still attached to the hose, has been paid out on completion of the refueling operation (see Figure 16). The weight 79 slides down the hauling line 15 with considerable velocity imparted to it by the relative wind and on reaching the end of the hauling line strikes the base of the plunger 55 and drives it inwards relatively to the sleeve 53 compressing spring 59 until the annular groove 58 registers with the balls 54 and allows them to recede inwards and become disengaged from the groove 49 of the socket 46, thus releasing the latter from the sleeve 53 and enabling the latter to be extracted from the socket by the tension of the hauling line. Before the hauling line can be paid out (as in Figure 16) the toggles 23, 25 must be withdrawn from the neck 69 of the nozzle 67 to release the latter from the nozzle-coupling 11, 12. This is effected by the springs 27, 28 on de-energising the hydraulic jacks 20. As soon as the toggles 23, 25 release the nozzle 67 the valve member 42 is returned to its seating by the springs 44, which, assisted by the springs 74, return the nozzle tip to the extended position shown in Figure 2. The closure of the valve 42 prevents escape of any fuel left in the hose as the nozzle leaves the nozzle-coupling 11, 12.

The neck 69 of the nozzle 67 is so shaped that when engaged with the toggles 23, 25 the tension in the hose tends to force the toggles outwards and, if this tension should exceed a critical value, the outward force on the toggles exerted by the neck of the nozzle-element will exceed the engaging force applied by the hydraulic jacks and the nozzle 67 will then be pulled out of the nozzle-coupling 11, 12.

It will be seen that when this occurs the valve 42 will immediately close and prevent the fuel, with which the hose is loaded under pressure, from escaping; and as soon as the nozzle 67 has cleared the toggles 23, 25 the tension in the hose is transmitted to the hauling line 15 through the pins 47, socket 46, balls 54, sleeve 53, stud 52 and rod 50. The shear strength of the pins 47 is so selected that they will shear under a critical tensile load in the hose exceeding that at which the nozzle 67 will force the toggles 23, 25 outwards to release it. If and when the pins 47 fail the spider member 37, 39, 40 attached to the hose 32 will separate from the socket 46 which will be left on the sleeve 53, and will remain, with the nozzle 67 and grapnel 63, attached to the hauling line 15.

The positions in which the parts of the refuelling apparatus illustrated in Figures 1 to 4 are mounted on and arranged with respect to the aircraft engaged in the refuelling operation are shown in Figures 11 to 20 which illustrate diagrammatically the refuelling technique. In these figures the receiver aircraft is designated by A and the tanker aircraft by B. The nozzle-coupling illustrated in Figure 1 is mounted at the tail of the receiver aircraft with the bell 11 facing aft. The hauling line 15, attached inside the aircraft to a winch (not illustrated since it forms no part of the present invention) controlled by a member of the receiver aircraft's crew, is rove through the fairlead 13, 14 of the nozzle-coupling (see Figure 1) and carries at its extremity the combined grapnel 63, latching-sleeve 53 and nozzle 67 as already described.

Before refuelling is due to commence the hauling line is kept hauled fully home, bringing the nozzle 67 into the coupling 11, where it is retained by the toggles 23, as shown in Figure 4, but detached from the spider member 37, latching-socket 46 and the other parts permanently connected to the hose 32 (Figure 2), all of which are at that time stowed in the tanker aircraft B.

When the receiver aircraft A is to be refuelled by the tanker B the receiver holds a straight course and its crew releases the toggles 23 and pays out the hauling line 15 through the fairlead 13, 14 substantially to its full extent. Owing to the weight of the massive nozzle 67, which acts as a sinker, the hauling line streams aft with a pronounced droop (see Figure 11). The tanker B takes station aft of the receiver A and slightly below and to one side of it (see Figure 11). From an opening in the belly of the tanker the tanker's crew then eject, by means of a device similar to a harpoon gun (not illustrated as not being part of the invention) a projectile 140 attached to a contact line 139 so as to pass across and underneath the bight of the hauling line 15 trailed by the receiver. The air drag of the contact line causes it to stream aft and engage the hauling line 15, and as the projectile drops, the contact line runs down the hauling line until it is trapped by the grapnel 63, on the end of the hauling line; and the enlarged tail of the projectile 140 (see Figure 20) prevents its from escaping from the grapnel 63, so that the hauling line and contact line are now connected together (see Figures 12 and 20).

The crew of the tanker B now reel in the hauling line (see Figure 13) while the pilot maneuvers the tanker to take station aft of and above the receiver A. The projectile 140, the grapnel 63 and nozzle 67 attached to the hauling line 15 are then hauled aboard the tanker, whereupon the crew of the tanker release the contact line 139 from the grapnel by pressing in the grapnel arms 63, and then connect the end of the hauling line 15 carrying the nozzle 67 and grapnel 63, to the hose 32 by pushing the latching sleeve 53 into the socket 46 carried by the spider member 37 attached to the end of the hose 32 and by pressing the plunger 55 inwards against the spring 59 to allow the balls 54 to pass the mouth of the socket 46 and enter the groove 49, in which they become locked on releasing the plunger 55, thus locking the nozzle 67 onto the spider member 37 and connecting the hauling line 15 to the hose 32 (see Figure 2).

The crew of the tanker B now pay out the hose 32 while the crew of the receiver A reel in the hauling line 15 (see Figure 14). This is continued until the nozzle 67 enters the nozzle-coupling 11 (see Figure 15) where it is locked as shown in Figure 4 by the toggle levers 23 on energizing the jacks 20 either under manual control or automatically, for instance by means such as those described in co-pending application for patent Serial No. 138,954 filed January 17, 1950. Refuelling can now proceed.

On completion of the refuelling, the crew of the receiver A release the toggle levers 23 from the nozzle 67 and allow the hauling line 15 to pay out (see Figure 16); and when a sufficient length has been paid out, the control mechanism of levers 89 (see Figure 4) is operated to release the annular weight 79 and allow it to be ejected by the spring 90 to slide down the hauling line and strike the plunger 55 so as to release the latching sleeve 53 from the socket 46 as hereinbefore described. The hose 32 carrying the spider member 37 and socket 46 is thus caused to part from the hauling line 15 carrying the latching sleeve 53 and the nozzle 67 (see Figure 17). All that now remains to be done is for the crew of the receiver A to reel in the hauling line and stow the nozzle 67 in the nozzle-coupling 11 (see Figure 4), and for the crew of the tanker to reel home and stow the hose 32.

If while refuelling is in progress the hose 32 is subjected to an excessive tension, owing for example to rough air conditions or to loss of station by the tanker aircraft B, an emergency break-away will occur. As already explained, the toggles 23 will release the nozzle 67 if the tension in the hose exceeds a lower critical value and the hauling line will then pay out. If the tension in the hose exceeds a higher critical value the shear pins 47 (see Figures 2 and 4) will fail and allow the hose 32 and spider member 37 to part from the hauling line 15, leaving the latching socket 46 attached to the latching sleeve 53. The hauling line 15, still carrying with it the nozzle 67, latching sleeve 53 and latching socket 46 can be either be left trailing or can be reeled in again by the crew of the receiver A, while the hose is reeled in again by the crew of the tanker B.

To resume the refuelling operation the tanker and receiver aircraft must regain formation, the hauling line must be left trailing or paid out again by the receiver A; and the contact line 139 must be ejected once more from the tanker B to be picked up by the grapnel 63 and reeled in to the tanker to bring the end of the hauling line together with the latching device 53, 54, 55, the nozzle 67 and the socket 46 aboard the tanker. The broken shear pins 47 having been extracted from the hollow boss 40 by removing the circlip 48, the socket 46 can be removed from the latching sleeve 53 and reconnected to the boss 40, by inserting new shear pins 47 and replacing the circlip 48 to retain them. The hose and hauling line, having been once more re-connected as shown in Figure 2, the sequence of operations illustrated in Figures 14 and 15 can be repeated and refuelling resumed. On completion of the resumed refuelling operation, the parts permanently connected to the hauling line are separated from those permanently connected to the hose in the normal manner by means of the sliding weight 79, the socket 46 remaining attached to the spider member 37 by the shear pins 47. It will be observed that the operation of this apparatus does not involve the transfer from the receiver aircraft to the tanker aircraft of any items of equipment, thus avoiding the necessity of carrying spare items in the receiver aircraft. It will further be observed that normal disconnection of the hauling line from the hose on completion of an operation can be effected by remote control from the receiver aircraft.

Figure 3:
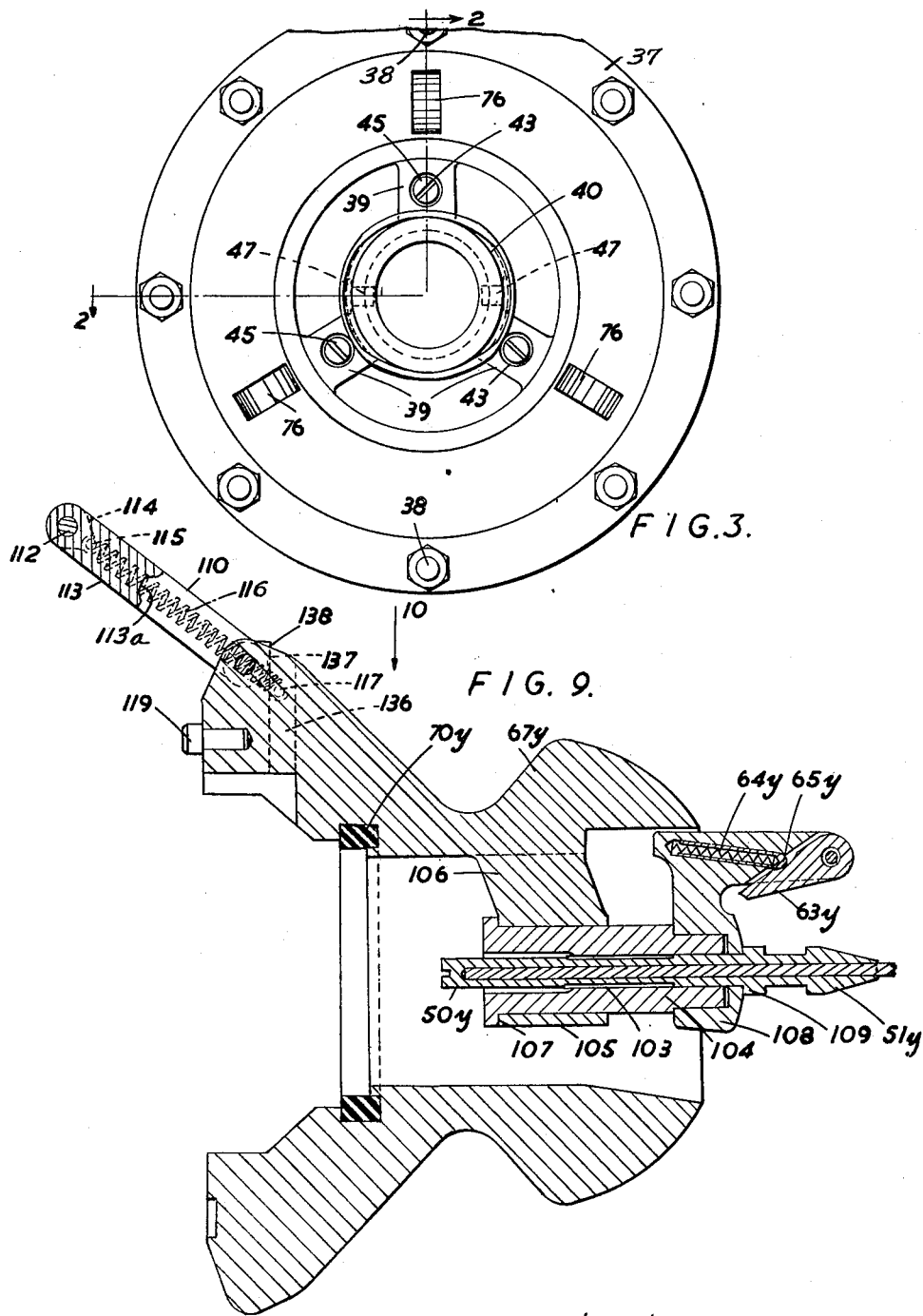
Figure 3 is an end elevation of the spider member separated from the latching member and nozzle, as seen from the right of Figure 2.

Figure 5 illustrates an alternative form of construction in which the nozzle element is permanently attached to the spider member and is separate from the latching device by which the hauling line is detachably connectible to the hose. In Figure 5 parts identically similar to corresponding parts in Figures 2 to 4 are designated by the same reference numerals, parts which are generally similar in form and function but differing in the details of shape or construction being designated by the same reference numerals distinguished by the index $x$.

As in the first form of construction, the hose (not shown) is connected to a joint member 34 having a male spherical portion 34$^a$ co-operating with female spherical joint rings 35$^x$, 36$^x$. In the present instance the nozzle-element 67$^x$ is directly connected by bolts (not shown) to the flange of the joint ring 35$^x$ and the outer part of the spider member 37$^x$ with which the spider arms 39$^x$ are integral is in the form of a short tube which fits into the large end of the nozzle and is located by means of an integral flange which is held between flat faces on the end of the nozzle 67$^x$ and on the female spherical packing ring 36$^x$. The boss 40$^x$ of the spider member is extended outwardly to form a bearing on which the hollow stem 41$^x$ of the valve member 42$^x$ slides and the valve member is urged onto its seating by means of a single compression spring 44$^x$ supported on the boss 40$^x$ and trapped between the arms 39$^x$ of the spider member and a flange at the outer end of the valve member 42$^x$.

As in the first form of construction, the latching device comprises a blind-ended sleeve 53$^x$ secured by a pin 52$^x$ to a hollow steel rod 50$^x$ swaged on the end of the hauling line 15 and having openings housing balls 54, a plunger 55$^x$ slidable within the sleeve 53$^x$ and having a circumferential ball-receiving groove 58$^x$, the movement of the plunger being limited by means of a stop screw 56$^x$, together with a socket 46$^x$ in which the sleeve 53$^x$ is slidably engageable and which is provided with an internal circumferential ball-receiving groove 49$^x$. As before, grapnel arms 63$^x$ are pivoted on radial brackets integral with the plunger 55$^x$ and engage a cone 51$^x$ formed on the end of the rod 50$^x$. In this instance, the plunger 55$^x$ is urged to the latch-engaging position by means of a single compression spring 59$^x$ supported on the outside of sleeve 53$^x$ and housed within an extension of the socket 46$^x$, being trapped between a shoulder on the sleeve 53$^x$ and the radial brackets 62$^x$ extending from the plunger 55$^x$.

In this construction, the valve member 42$^x$ seats on the interior of the nozzle 67$^x$ and is downstream of the spider member 37$^x$, 39$^x$ and the boss 40$^x$ of the spider member has a blind end facing upstream to seal the interior of the hose against escape of fuel through the hollow boss 40$^x$ when the latching device 53$^x$, 54, 55$^x$ is disconnected.

In this form of construction the shearable pins 47$^x$ are inserted through radial drillings in the nozzle 67$^x$ and in the arms 39$^x$ of the spider member to enter a circumferential external groove 96 formed in the socket 46$^x$ and are retained by set screws 98 screwed into the nozzle 67$^x$ and projecting into a slot 98$^a$ formed therein to engage grooves 97 formed in the heads of the shearable pins. When the tensile load in the hose and hauling line exceeds the critical shear strength of the pins 47$^x$ the tips of these pins are sheared off and the socket 46$^x$ remains connected to the latching device 53$^x$, 54, 55$^x$ and is extracted from the boss 40$^x$ of the spider member.

The nozzle tip 71$^x$ has an extended skirt 99 fitting slidably in the nozzle 67$^x$ and provided with a slot 100 into which projects a grub screw 101 screwed into the nozzle 67$^x$ to limit the movement of the nozzle tip relatively to the nozzle 67$^x$; and integral radial lugs 102 project inwardly from the skirt 99 to engage the end of the stem 41$^x$ of the valve member 42$^x$ and move the valve member off its seating against the effort of spring 44$^x$ when the nozzle tip 71$^x$ is moved inwardly with respect to the nozzle 67$^x$, as occurs when the nozzle enters the nozzle-coupling illustrated in Figure 1 and is drawn into it by the toggles 23, 25, it being understood that in this form of construction the nozzle-coupling is identical with that illustrated in Figures 1 to 4. In the form of construction of Figure 5 there is no separate spring for extending the nozzle tip 71$^x$, since this function is performed by the valve spring 44$^x$, the nozzle being permanently secured to the spider member.

In this form of construction also the relief valve 93$^x$ is located in the nozzle 67$^x$ and communicates with the interior thereof through an opening in the tubular portion of the spider member 37$^x$, and with atmosphere through openings in the nozzle 67$^x$ and in the flange of the joint ring 35$^x$.

In this form of construction, since the nozzle is secured to the spider member and is, therefore, permanently attached to the hose, the weight on the end of the hauling line, when the latter is being trailed before contact is established with the tanker aircraft, is quite small and consequently the hauling line streams almost horizontally. This form of construction is therefore adapted to a somewhat different technique to that hereinbefore described with reference to Figure 11 for effecting contact with the hauling line by the tanker aircraft. The preferred method is for the tanker to fly on a course crossing that of the receiver and to trail the contact line across the hauling line to meet the latter from above.

In other respects the procedure for connecting the hauling line to the hose, receiving and securing the nozzle in the nozzle-coupling, transferring the fuel, releasing the hauling line and disconnecting it from the hose by remote control exerted by means of the weight 79 is the same as that described with reference to Figures 12 to 17, using the form of construction illustrated in Figures 2 to 4, 18 and 19; the emergency breakaway procedure being likewise similar, extraction and replacement of the damaged shearable pins 47$^x$ being made possible and easy by slacking back the retaining screws 98.

The form of construction as illustrated in Figures 6 to 9 resembles that illustrated in Figures 2 to 4, 18 and 19 insofar as the nozzle is permanently mounted on the hauling line, but differs therefrom in that the latching device is mounted on the nozzle and engages directly with the shearable pins; and further, in the use of a different method of releasing the latching device by remote control from the tanker aircraft on completion of a refuelling operation.

The same convention with regard to reference numerals is followed as in the description of Figure 5, the reference numerals applied to parts generally similar to parts previously described but differing in detail being in this case distinguished by the index $y$.

In the construction of Figures 6 to 9 the steel rod 50$^y$, into which the hauling line is swaged and of which the inboard end is tapered to a cone 51$^y$, is screwed into a cylindrical plug 104 on which is slidably mounted a hollow boss 105 integrally connected by arms 106 with the nozzle 67$^y$. The nozzle is thus slidable on the end of the hauling line within limits defined by flange 107 on the outboard end of the plug 104 and a boss 108 spigoted on the other end of the plug 104 and retained by means of an enlargement of 109 of the rod 50$^y$, the boss 108 being integral with the brackets 62$^y$ on which the grapnel arms 63$^y$ are pivoted.

The outer shell of the spider member 37$^y$ is integrally connected by radial arms 39$^y$ with a hollow central boss 40$^y$ in which the stem 41$^y$ of the valve member 42$^y$ is slidable; and the latter is urged to seat in the interior of the spider member shell by a compression spring 44$^y$ mounted on the stem 41$^y$ and trapped between a flange at the end of the latter and the boss 40$^y$. As before, the flange of the spider member 37$^y$ is secured by bolts 38$^y$ to a mating flange of the female spherical joint ring 35$^y$, the female portion of the spherical joint being in this instance completed by an integral portion 36$^y$ of the spider member 37$^y$ instead of by means of a separate packing ring. The male portion 34$^a$ of the spherical joint is formed, as in the construction illustrated in Figures 2 to 4, on a joint member 34 into which the adaptor 33 connected to the hose 32 is screwed.

When the nozzle is secured to the spider member by means of the toggle linkage hereinafter described, the outer end of the spider member 37$^y$ engages a sealing ring 70$^y$ housed in a circumferential recess in the interior of the nozzle 67$^y$ to seal the joint between the spider member and the nozzle and the end of the valve stem 41$^y$ engages the flanged end of the plug 104. Until the nozzle 67$^y$ enters the nozzle-coupling 11, 12 (see Figure 1) the spring 44$^y$ keeps the valve member 42$^y$ on its seating and maintains the plug 104 and nozzle 67$^y$ in the relative position shown in Figure 6 with the flange 107 almost abutting against the boss 105.

The latching device is constituted by a pair of toggle linkages each comprising a pair of links 110 pivotally mounted on pins 111 secured to the nozzle 67$^y$, a pivot pin 112 rotatable in the outer ends of the links 110, a short central link 113 secured to the pin 112 and having a notch 113$^a$ in its free end, and lugs 114 fast on the pin 112 and having eccentric pins 115 to which are attached tension springs 116 anchored on pins 117 secured to the nozzle.

The notches 113$^a$ of the links 113 are engageable with the shearable pins 47$^y$ which are mounted in forks 118 which are integral with and extend from the outer female spherical joint ring 35$^y$. When the notch 113$^a$ of link 113 has been engaged with the shearable pin 47$^y$, the toggle linkage is locked by rotating the links 110 in a counterclockwise direction, as seen in Figure 6, until the linkage passes over dead centre, further movement in this direction being arrested by engagement of the link 113 with a plunger 135 forming part of a toggle linkage-releasing mechanism hereinafter more fully described. This is the position shown in the top half of Figure 6.

The axes of the spring anchorages 115, 117 are so mutually disposed with respect to the axes of the pivot pins 112, 111, respectively, that, in the position shown in the top half of Figure 6, the axis of the spring 116 lies below that of the shearable pin 47$^y$, the spring thus tending to retain the toggle linkage in the locked position. Owing, however, to the position of the spring anchorage pin 115, the axis of the spring passes above that of the pivot pin 112 so that, when the linkage is pushed over the dead centre in the releasing direction, the spring tension tends to rotate the short link 113 relatively to the links 110 in a clockwise direction, as seen in Figure 6, and in this way positively helps to release toggle linkage.

To ensure correct alignment of the toggle linkages 110—117 with the shearable pins 47$^y$, the nozzle is provided with a dowel 119 which must be brought into register with an opening 120 in the flange of the spider member when latching the nozzle to the female spherical joint ring 35$^y$.

The form of construction illustrated in Figures 6 to 9 is adapted to the operating technique described in connection with Figure 5, in which the hauling line is trailed with substantially no droop. For this reason the nozzle 67$^y$ is of light construction and is formed with a flared skirt 121, to which is secured by bolts 123 a sheet metal drogue 122. To house the toggle linkages when disconnected, the skirt 121 of the nozzle 67$^y$ is formed with two pockets 124 in each of which is an integral central rib 125 in which the toggle pivot pin 111 is mounted, the spring anchorage pins extending inwards from the sides of the pocket on either side of the rib 125. The dowel 119 is mounted in one of the central ribs 125.

The female spherical joint ring 35$^y$ is provided with cylindrical recesses 126 communicating by means of passages 127, 128 and 129 with the interior of the spider member 37$^y$. In each recess 126 is screwed a cylinder 130, between the open lower end of which and a shoulder near the base of the recess 126 is trapped a washer 131 having a central opening of smaller diameter than the internal diameter of the cylinder 130. In the cylinder 130 is slidably mounted a piston 132 between which and a cover 133 screwed onto the open end of the cylinder 130 is trapped a compression spring 134. A gasket 131$^a$, which seats on the washer 131, is retained in a groove formed in a reduced-diameter extension of the piston 130 which enters the central opening in the washer 131. The plunger 135 previously referred to is mounted centrally in the piston 132 and extends through an opening in the cylinder cover 133 to engage the link 113 of the toggle linkage when the latter is in the locked position, as shown in Figure 6, in which position the axis of the plunger 135 intersects the axis of the pivot pin 112. The setting of the spring 134 is such that the maximum internal pressure in the hose attained during the refuelling operation and transmitted to the recess 126 through the passages 127, 128, 129 is insufficient to lift the piston 132 off the washer 131 against the effort of the spring 134, but on the application to the interior of the hose, e. g. in the manner hereinafter described, of a considerably greater pressure, the piston 132 is lifted off its seating thereby raising the plunger 135 to push the toggle linkage 110—117 over dead centre and release the nozzle from the female spherical joint ring 35y and spider member 37y.

When the nozzle is drawn into the nozzle-coupling 11, 12 by the toggles 23, 25 (see Figure 1), the boss 108 meets the central fairlead 14, which in this instance extends further towards the mouth of the nozzle-coupling than as shown in Figure 1; the boss 108, together with the plug 104 and valve stem 41y, is thereby moved relatively to the nozzle 67y to the left as seen in Figure 6 to compress the spring 44y and move the valve member 42y off its seating. On withdrawal of the toggles 23, 25 the spring 44y returns the valve member 42y to its seating and moves the nozzle 67y relatively to the plug 104 and boss 108 to the left as seen in Figure 6, thus restoring the relative position of these parts shown in Figure 6.

If the tensile load in the hose exceeds a lower critical value the nozzle-retaining force exerted by the toggles 23, 25 (Figures 1 and 4) will be overcome and the nozzle will pull out of the nozzle-coupling as described with reference to the examples of Figures 1 to 4. When this occurs, the spring 44y being no longer resisted immediately returns the valve member 42y onto its seating. At a higher critical load in the hose the shearable pins 47y will fail and allow the spider-member to part from the nozzle disconnecting the hose from the hauling line.

The shearable pins 47y are an easy push fit in the forks 118 so that, after failure of the shearable pins, their broken ends can easily be extracted from the forks and replacement pins inserted on bringing the hose end aboard the tanker.

On completion of a normal refuelling operation and after releasing the nozzle from the nozzle-coupling and paying out the hauling line (as in Figure 16), disconnection of the hauling line from the hose (as in Figure 17) by releasing the nozzle 67y from the female spherical joint member 35y is preferably effected by introducing from the tanker aircraft an inert gas into the hose at a pressure considerably exceeding the maximum internal pressure to which the hose is subjected when loaded with fuel. Application of this excess gas pressure causes the pistons 132 to raise the plungers 135 and trip the toggle linkages 110—117. Positive tripping action is ensured by the fact that the gas pressure is at first applied to the piston over the small area of the opening in the washer 131, but as soon as the piston has started to lift, the gas pressure is applied over the whole area of the face of the piston, thus increasing the total force applied to the piston and ensuring a rapid rise of the plunger to trip the toggle linkage.

When the toggle linkages are moved over the dead centre in the releasing direction the resultant of the forces applied by the shearable pins 47y and the springs 116 to the links 113 cause the links 110 to be flung outwards smartly to reach the position shown in the lower half of Figure 6 in which the axes of the spring anchorages 115, 117 and of the pivot pins 111, 112 are substantially in line so that the toggle linkage has no tendency to spring back. In this position the toggle linkages are housed within the pockets 124 of the skirt 121 of the nozzle 67y.

Figures 9 and 10 illustrate a modification of the nozzle 67y in which the extended skirt 121 and drogue 122 are omitted. In this instance the nozzle 67y is of massive construction and intended to act as a sinker for the hauling line, the appropriate operational technique being that described with reference to Figures 11 to 17, using the form of construction illustrated in Figures 1 to 4. The large end of the body of the nozzle 67y is slotted at 136 to accommodate the toggle links 110, springs 116 and the spring anchorage pins 117. The toggle links 110 are provided with a flat face 133 which, in the disengaged position of the toggle linkage as shown in Figure 9, engages a shoulder 137 formed in the slot 136. The toggle linkage is shown in the engaged position in Figure 10. In all other respects the construction illustrated in Figures 9 and 10 is the same as that illustrated in Figures 6 and 8.

We claim:

1. Apparatus for transferring liquid from one aircraft to another in flight, comprising, in combination with a hose attached to the first aircraft, a hose-coupling member mounted on the end of the hose, and a hauling line trailable from the second aircraft and wholly permanently attached thereto, a grapnel permanently attached to the hauling line, a latching device permanently mounted on the hauling line for detachably securing the latter to the coupling member, a frangible connection between the coupling member and the latching device for transmitting tensile load from the hose to the hauling line through the latching device, said connection adapted to break to disconnect the coupling member from the latching device when said tensile load exceeds a critical value, and means remotely controllable from one of the aircraft for releasing the latching device to disconnect it from the hose intentionally.

2. The combination claimed in claim 1 including a necked nozzle-element permanently secured to the hose coupling member, a latch-engaging member enclosed in the nozzle-element and connected to the hose-coupling member by the frangible connection, a nozzle-receiving liquid-transmitting coupling element mounted in the second-named aircraft, and a releasable retaining device mounted on the coupling element and engageable with the neck of the nozzle-element.

3. The combination claimed in claim 1 including a liquid transmitting universal joint connecting the hose coupling member to the hose.

4. The combination claimed in claim 1, in which the latching device comprises a sleeve having an opening therein, a ball located in the opening, a member slidable in the sleeve and having a ball-receiving recess which when in register with the balls allows the latter to recede into the opening so as not to stand proud of the sleeve, said member in other positions engaging the ball and causing it to stand proud of the sleeve, and spring-means urging the slidable member to a position in which the ball is caused to stand proud, the combination further including a second sleeve connected to the coupling member by the frangible connection, and slidable externally on the first-named sleeve, said second sleeve having an internal recess engageable with the ball when standing proud of the first-named sleeve.

5. The combination claimed in claim 1, in which the last-named means comprises a device mounted on the coupling member and responsive to internal fluid pressure in the hose for releasing the latching device to disconnect the hose from the hauling line on the application to the hose, of an internal fluid pressure considerably exceeding the highest pressure to which the hose is subjected when loaded with liquid.

6. Apparatus for transferring liquid from one aircraft to another in flight, comprising, in combination with a hose attached to the first aircraft, a hose-coupling member mounted on the end of the hose, and a hauling line trailable from the second aircraft and wholly permanently attached thereto, a grapnel permanently attached to the hauling line, a latching device permanently mounted on the hauling line for detachably securing the latter to the coupling member, a frangible connection between the coupling member and the latching device for transmitting tensile load from the hose to the hauling line through the latching device, said connection adapted to break to disconnect the coupling member from the latching device when said tensile load exceeds a critical value, and means remotely controllable from one of the aircraft for releasing the latching device to disconnect it from the hose intentionally, and a necked nozzle-element mounted on the hauling line in association with the latching device and engageable in a fluid-tight manner with the hose coupling member on engagement of the latching device to secure the hauling line to the coupling member, a nozzle element-receiving liquid-transmitting coupling element mounted on the second-named aircraft, and a releasable retaining device mounted on the coupling element and engageable with the neck of the nozzle-element to draw the latter into and secure it in the coupling element.

7. The combinatinon claimed in claim 6, in which the nozzle-element is of relatively massive construction whereby it serves as a sinker for the hauling line prior to connection of the latter to the hose by means of the named latching device and cooperating means.

8. The combination claimed in claim 6, in which the nozzle-element is of relatively light construction and includes a drogue serving to cause the hauling line to stream without appreciable droop when not connected to the hose.

9. The combination claimed in claim 6 including a latch-engaging element connected to the hose coupling member by the frangible connection.

10. Apparatus for transferring liquid from one aircraft to another in flight, comprising, in combination with a hose attached to the first aircraft a hose-coupling member mounted on the end of the hose, and a hauling line trailable from the second aircraft and wholly permanently attached thereto, a grapnel permanently attached to the hauling line, a latching device permanently mounted on the hauling line for detachably securing the latter to the coupling member, a frangible connection between the coupling member and the latching device for transmitting tensile load from the hose to the hauling line through the latching device, said connection adapted to break to disconnect the coupling member from the latching device when said tensile load exceeds a critical value, and means remotely controllable from one of the aircraft for releasing the latching device to disconnect it from the hose intentionally, and a nozzle-element operatively associated with the hose coupling member, a nozzle element-receiving coupling element mounted on the second-named aircraft, said coupling element including a liquid-transmitting passage and a central fairlead through which the hauling line passes, and means for drawing the nozzle-element into the coupling element and securing it therein.

11. The combination claimed in claim 10 including a valve-member axially slidable in the coupling member, a valve-seating, spring means urging the valve-member outwardly to engage the seating and prevent liquid from escaping from the hose, the nozzle-element comprising a body portion and a terminal portion axially slidable on the body portion, said terminal portion including an element engageable with the valve-member to push it off its seating when the terminal portion is moved towards the body portion, together with stop means preventing separation of the terminal portion from the body portion of the nozzle-element.

12. The combination claimed in claim 11 including spring means urging the terminal portion of the nozzle-element away from the body portion thereof to engage said stop means.

13. The combination claimed in claim 10 including a valve for closing the hose outlet, said valve being housed in the hose coupling member, spring means urging said valve to closed position and means operative to open the valve on reception of the nozzle-element by the coupling element.

14. The combination claimed in claim 10 including a grapnel-mounting member secured to the hauling line, the nozzle-element being mounted on the grapnel-mounting member and having limited freedom to slide axially thereon and the latching device being mounted on the nozzle-element, a valve-member axially slidable in the hose-coupling member and engageable by the grapnel-mounting member when the nozzle-element is latched to the coupling member, a valve seating in the hose-coupling member, spring means urging the valve-member onto the seating to close the hose against escape of liquid and move the grapnel-mounting member relatively to the nozzle-element away from the coupling member, the grapnel-mounting member being engageable by the mentioned central fairlead and thereby movable relatively to the nozzle-element towards the hose-coupling member to move the valve-member off its seating against the effort of the said spring-means when the nozzle-element is drawn into and secured in the coupling element.

15. Apparatus for transferring liquid from one aircraft to another in flight, comprising, in combination with a hose attached to the first aircraft, a hose-coupling member mounted on the end of the hose, and a hauling line trailable from the second aircraft and wholly permanently attached thereto, a grapnel permanently attached to the hauling line, a latching device permanently mounted on the hauling line for detachably securing the latter to the coupling member, a frangible connection between the coupling member and the latching device for transmitting tensile load from the hose to the hauling line through the latching device, said connection adapted to break to disconnect the coupling member from the latching device when said tensile load exceeds a critical value, and means remotely controllable from one of the aircraft for releasing the latching device to disconnect it from the hose intentionally, said latching device including a toggle linkage pivoted on the nozzle-element and engageable with the frangible connection.

16. The combination claimed in claim 15, in which the means for releasing the latching device includes a spring-loaded plunger mounted on the coupling member and subjected to the internal pressure of the hose, being movable thereby against its spring-loading to engage the toggle linkage and move it over dead-centre to release it from engagement with the frangible connection when the internal pressure in the hose exceeds a critical value considerably greater than the highest pressure to which the hose is subjected when loaded with liquid, and means for applying inert gas to said hose at a pressure in excess of said critical value.

17. The combination claimed in claim 15 including a grapnel-mounting member secured to the hauling line, the nozzle-element being mounted on the grapnel-mounting member and having limited freedom to slide axially thereon, a valve-member axially slidable in the hose-coupling member and engageable by the grapnel-mounting member when the nozzle-element is latched to the coupling member, a valve seating in the hose-coupling member, spring means urging the valve-member onto the seating to close the hose against escape of liquid and move the grapnel-mounting member relatively to the nozzle-element away from the coupling member, the grapnel-mounting member being engageable by the mentioned coupling element and thereby movable relatively to the nozzle-element towards the hose-coupling member to move the valve-member off its seating against the effort of the said spring-means when the nozzle-element is drawn into and secured in the coupling element by the mentioned toggle device.

18. Apparatus for transferring liquid from one aircraft to another in flight, comprising, in combination with a hose attached to the first aircraft, a hose-coupling member mounted on the end of the hose, and a hauling line trailable from the second aircraft and wholly permanently attached thereto, a grapnel permanently attached to the hauling line, a latching device permanently mounted on the hauling line for detachably securing the latter to the coupling member, a frangible connection between the coupling member and the latching device for transmitting tensile load from the hose to the hauling line through the latching device, said connection adapted to break to disconnect the coupling member from the latching device when said tensile load exceeds a critical value, and means remotely controllable from one of the aircraft for releasing the latching device to disconnect it from the hose intentionally, said last-named means comprising a weight slidable on the hauling line, and controllable means in the second aircraft for retaining the weight and releasing it at will to slide down the hauling line and strike the latching device, the latter including means responsive to the impact of the weight for disconnecting it from the coupling member.

19. The combination claimed in claim 18 including a latch-engaging member connected to the hose-coupling member by the frangible connection and detachably connectible to the latching device, the latter being fixed to the hauling line and detachable from the latch-engaging member by the weight-impact-responsive means.

20. The combination claimed in claim 18, wherein the weight-retaining and releasing means includes a spring device giving the weight an initial impulse to eject it when released.

CHARLES HARRY SMITH.
PETER STEVENS MACGREGOR.

References Cited in the file of this patent

UNITED STATES PATENTS

| Number | Name | Date |
| --- | --- | --- |
| 515,220 | Harris | Feb. 20, 1894 |
| 541,908 | Weaver | July 2, 1895 |
| 950,263 | Harpster | Feb. 22, 1910 |
| 1,901,973 | Macey | Mar. 21, 1933 |
| 2,166,575 | Atcherley | July 18, 1939 |
| 2,199,588 | Cobham | May 7, 1940 |
| 2,279,146 | Schneller | Apr. 7, 1942 |
| 2,434,167 | Knoblauch | Jan. 6, 1948 |